United States Patent
Rohde

(10) Patent No.: US 7,978,980 B2
(45) Date of Patent: Jul. 12, 2011

(54) METHOD FOR TRANSMITTING OPTICALLY TRANSMITTED DATA VIA A RADIO ANTENNA AND CORRESPONDING DEVICE

(75) Inventor: Harald Rohde, München (DE)

(73) Assignee: Siemens Home and Office Communication Devices GmbH & Co., Munich (DE)

( * ) Notice: Subject to any disclaimer, the term of this patent is extended or adjusted under 35 U.S.C. 154(b) by 753 days.

(21) Appl. No.: 11/989,756

(22) PCT Filed: May 12, 2006

(86) PCT No.: PCT/EP2006/004498
§ 371 (c)(1),
(2), (4) Date: Jan. 31, 2008

(87) PCT Pub. No.: WO2007/131520
PCT Pub. Date: Nov. 22, 2007

(65) Prior Publication Data
US 2009/0087187 A1    Apr. 2, 2009

(51) Int. Cl.
*H04B 10/00* (2006.01)
(52) U.S. Cl. ........ 398/115; 398/116; 398/135; 398/136; 455/561; 455/277; 455/422; 455/426; 370/310; 370/338; 370/328
(58) Field of Classification Search ................. 398/115, 398/116, 118, 119, 126, 127, 128, 130, 135, 398/136, 138, 139, 202, 208, 210, 211, 214, 398/187, 186, 183, 41, 66, 67, 68, 69, 71, 398/72, 76, 79, 82, 85; 455/561, 277, 562, 455/422, 426, 422.1, 445; 370/310, 338, 277, 328, 329, 339, 335
See application file for complete search history.

(56) References Cited

U.S. PATENT DOCUMENTS

| 7,013,087 B2 * | 3/2006 | Suzuki et al. ............ 398/115 |
| 7,668,463 B2 * | 2/2010 | Liu et al. ................ 398/115 |

FOREIGN PATENT DOCUMENTS

| EP | 0 845 878 | 6/1998 |
| EP | 1 357 683 | 10/2003 |
| WO | WO 98/04057 | 1/1998 |
| WO | WO 03/067321 | 8/2003 |

OTHER PUBLICATIONS

L. Noël et al., "120Mbit/s QPSK radio-fibre transmission over 100km of standard fibre at 60GHz using a master/slave injection-locked DFB laser source", Electronics Letters, Sep. 26, 1996, vol. 32, No. 20, pp. 1895-1897.

* cited by examiner

*Primary Examiner* — Hanh Phan
(74) *Attorney, Agent, or Firm* — Staas & Halsey LLP

(57) ABSTRACT

In a method a carrier signal is modulated depending on data to be transmitted. The modulated carrier signal is transmitted via an optical fiber line. The transmitted modulated carrier signal is demodulated, thereby producing received data. The transmitted modulated carrier signal is used to produce an auxiliary carrier signal. The auxiliary carrier signal is modulated depending on the received data and then transmitted via a radio antenna.

21 Claims, 2 Drawing Sheets

METHOD FOR TRANSMITTING OPTICALLY TRANSMITTED DATA VIA A RADIO ANTENNA AND CORRESPONDING DEVICE

CROSS REFERENCE TO RELATED APPLICATIONS

This application is based on and hereby claims priority to PCT Application No. PCT/EP2006/004498, filed on May 12, 2006, the contents of which are hereby incorporated by reference.

BACKGROUND

In a method for transmitting optically transmitted data via a radio antenna:
  A carrier signal is modulated depending on data to be transmitted or depending on a data signal to be transmitted while creating a modulated carrier signal,
  The modulated carrier signal is transmitted over an optical fiber line and
  After the transmission over the optical fiber line, the data is sent via a radio antenna.
  Such methods are also referred to as "optical radio" and are employed for example with expensive monomode glass fibers. Expressed in other words this especially involves methods for optical transmission of radio frequency signals to a radio antenna.

SUMMARY

One potential object is to specify a simple method which can be employed especially with a long glass fiber, with low cost polymer fibers and/or with large carrier frequencies as well. In addition a device is to be specified which is especially suitable for executing this method.

In addition to the steps stated at the start, the inventor proposes the following steps:
  Demodulation of the transmitted modulated carrier signal while creating received data or a received data signal, which is then to be sent or is sent via the radio antenna, so that a regeneration of the data to be sent via the radio antenna can also be referred to,
  Creating an auxiliary carrier signal from the transmitted modulated carrier signal,
  Modulation of the auxiliary carrier signal depending on the received data or the received data signal, and
  Transmitting the modulated auxiliary carrier signal via a radio antenna.

The proposed method and device proceed from the idea that there are applications for which the transmission of a carrier frequency in the Gigahertz range e.g. greater than 20 Gigahertz, is desirable, since for example at such frequencies frequency generators are expensive and difficult to implement. In particular it is difficult to implement these generators with low noise, especially low phase noise. On the other hand however a transmission of the data in the radio frequency band, i.e. at the high frequencies, leads to the transmission link over the optical fiber line being restricted without additional measures such as regenerators, for example because of the attenuation and the dispersion in the optical fiber line.

Therefore in the method the transmitted modulated carrier signal is demodulated as the received data or the received data signal is created. A regenerated auxiliary carrier signal is also created from the transmitted modulated carrier signal, said auxiliary signal preferably having the same frequency as the modulated carrier signal or a multiple of the frequency of the carrier signal, for example a whole number multiple. After a modulation of the auxiliary carrier signal depending on the received data or the received data signal, the transmission via a radio antenna and via a radio transmission link, despite the attenuation and/or distortions of the signal which occur there, is possible at a low error rate and especially in a passive antenna head. In one embodiment separate modulation methods are used for the modulation of the carrier signal and the modulation of the auxiliary carrier signal. Alternatively however the same modulation methods are also used.

The method is especially used for so-called MIMO (Multiple Input Multiple Output) applications or for directed radio emissions, especially in so-called pico cells, i.e. in radio cells with a diameter of less than 35 meters, but also for operation of base stations of a mobile data transmission network.

In a development of the method the carrier signal is modulated in accordance with an amplitude modulation as a function of the data to be transmitted or as a function of the data signal to be transmitted. This development is based on the idea that, because of the attenuation of the optical fiber line or because of the dispersions in the optical fiber lines, phase modulations, e.g. PSK (Phase Shift Keying) or QAM (Quadrature Amplitude Modulation) make only comparatively short transmission links possible, especially for carrier signals with very high frequency, for example greater than 20 Gigahertz. By contrast amplitude modulation is only adversely affected by attenuation, so that even longer transmission links or "lower-cost" optical fiber lines can be used.

In a further development the difference between a peak value and the following minimum value in the modulated carrier signal remains the same in the amplitude modulation regardless of changes resulting from differing data values. Thus for example both the peak value and also the minimum value of the carrier signal are changed depending on the data to be transmitted. In this way the carrier signal is able to be modulated in a simple manner.

In an alternative development in the amplitude modulation the difference between a peak value and the following minimum value in the modulated carrier signal depends on the value of the data item to be transmitted, especially also between changes in the data value to be transmitted. For example only the peak value is changed depending on the data to be transmitted, with the minimum value being retained however. Alternatively the process can also be reversed. In these developments the degree of modulation of the carrier signal is especially large.

In a next development of the method the auxiliary carrier signal is created from the received main carrier signal using a PLL (Phase Locked Loop). The phase locked loop allows an auxiliary carrier signal to be created even for a received carrier signal with heavy interference. In addition phase equivalence or a strict phase relationship between the two signals can be created in a simple manner. This phase equivalence is especially necessary in MIMO applications. With embodiments the phase locked loop for example also performs a frequency increase, especially a frequency doubling or a frequency trebling.

In a next development of the method the auxiliary carrier signal is created using a filter unit, especially using a narrowband filter unit compared to the frequency of the auxiliary carrier signal, with narrowband meaning that the filter unit for example only allows through signals with an attenuation of less than 3.5 dB at frequencies in a frequency range which lies below the frequency of the carrier signal by a value of less than 5 percent and which lies at most 5 percent above the frequency of the carrier signal. The filter unit is especially a bandpass filter, e.g. a filter with a small phase angle in the passthrough band such as a Chebyshev filter.

With a next development the method for operating a number of antennas is used, which simultaneously transmit data over a number of radio transmission links to a terminal. These applications are also referred to as MIMO (Multiple Input Multiple Output) and guarantee even with very weak signals that error-free data transmission to a terminal can be executed.

In another development the optical fiber line is a polymer fiber line, especially made of organic polymers, for example a PMMA line (Polymethylmethacrylate) or another polymer line. Polymers are macromolecules with molar masses for example greater than 104 gmol−1. These fiber lines are for example gradient fibers and cost significantly less compared to glass fibers, especially monomode glass fibers. However the attenuation and dispersion of these fiber lines is also significantly greater by comparison with glass fiber lines, especially monomode glass fiber lines. However the polymer fiber may also be used on the basis of the method with transmission links longer than 50 m and frequencies of the carrier signal greater than 20 Gigahertz.

In a next development of the method a radio signal is also received via the transmit antenna or via an additional receive antenna. The auxiliary carrier is used for demodulation of the received radio signal. This enables a bidirectional data transmission to be undertaken. In particular polymer fibers can also be used for the return path at high carrier signal frequencies of greater than 20 Gigahertz and line lengths over 50 meters or 500 meters.

In another development the auxiliary carrier is used for modulation with data to be transmitted back or with a data signal to be transmitted back. The modulated auxiliary carrier is transmitted over an optical fiber line or over a further optical fiber line. The two optical fiber lines have especially the same physical characteristics. If only one optical fiber line is used, multiplex methods are employed, for example time division multiplexing or frequency division multiplexing.

The inventor additionally proposes a device, especially an optical radio antenna head. The antenna head contains an optical/electrical converter unit, e.g. a radiation-absorbing diode, e.g. a pn-diode a pin-diode or a so-called avalanche diode. In addition the antenna head contains a first separation unit connected downstream from the converter unit, for example a lowpass, which lets the transmitted data signals through. Furthermore the antenna head contains a second splitting unit which transmits signals of a carrier signal but strongly attenuates the data signals. Connected downstream from the two splitting units is a signal mixer unit or modulator unit which is used for mixing or modulating the signals coming from the first splitting unit of the second splitting unit.

Even without further intermediate units between the splitting units and the mixer unit or modulator unit the signal can be processed in the antenna head, which enables long transmission links or "low-cost" polymer fibers to be used. In particular the antenna head can be constructed passively, i.e. without additional power supply.

In a next development however a modulation unit is arranged between the first splitter unit and the mixer unit, especially a modulation unit with digital signal processor. The modulation unit creates a modulated data signal in a baseband. In the mixer unit the baseband is then displaced as a result of the mixing into the high-frequency range. This means that the modulation unit can be of a simpler design by comparison with the case in which the high-frequency carrier signal is directly modulated.

In a next development the antenna head contains a phase lock loop which is connected downstream from the second splitter unit and upstream from the mixer unit. The servo control or PLL enables a simple reconstruction of the carrier signal to be undertaken, for example even with a frequency increase.

In a next development the antenna head contains a mixer unit downstream from the radio antenna. The radio antenna is designed in another development for a transmit frequency greater than 20 Gigahertz or even greater than 50 Gigahertz.

In a next development the device contains an optical fiber line which leads to the optical/electrical converter unit. The optical fiber line is especially a polymer fiber line with a length greater than 50 m at frequencies of a carrier signal which is transmitted over the fiber line of greater than 20 Gigahertz.

In another development the radio antenna also serves as a receive antenna. Alternatively there is an additional receive antenna. Connected downstream from the receive antenna is a demodulator unit so that a bidirectional data transmission can be performed.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
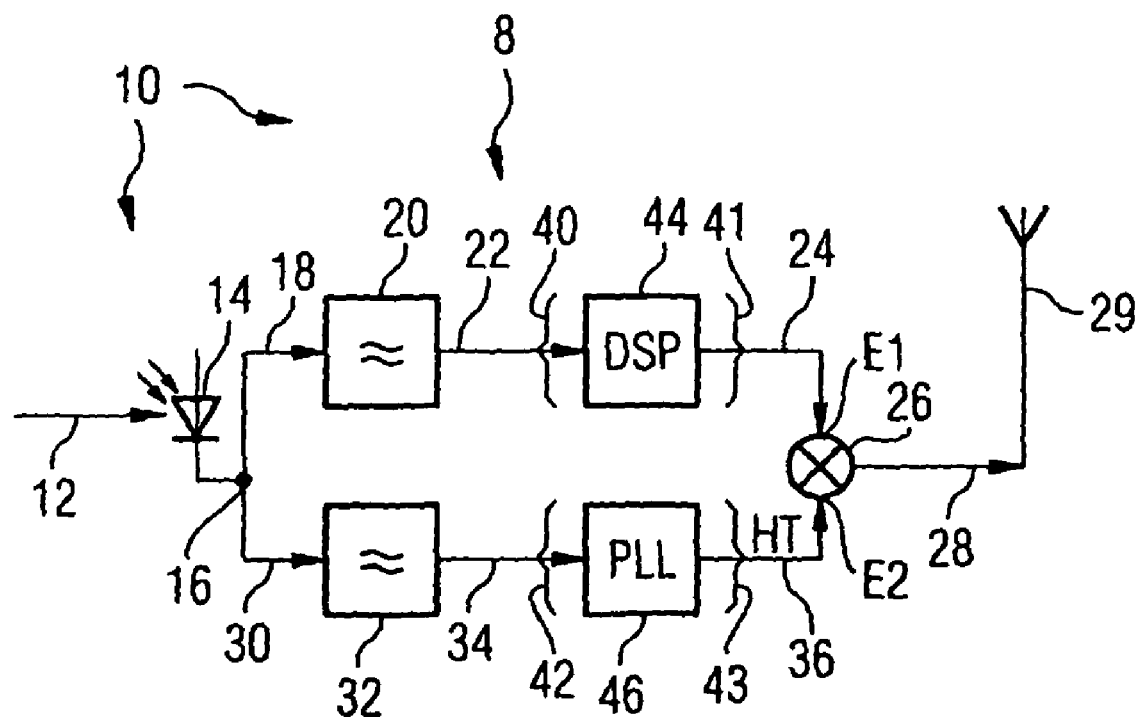
FIG. 1 a basic circuit diagram of a transmit section of an antenna head.

Reference will now be made in detail to the preferred embodiments of the present invention, examples of which are illustrated in the accompanying drawings, wherein like reference numerals refer to like elements throughout.

FIG. 1 shows a basic circuit diagram of a transmit section 8 of an antenna head 10. The antenna head 10 is connected to a polymer fiber 12 which leads to an optical receive diode 14. A terminal of the receive diode 14 of the antenna head 10 leads to a branch 16. From the branch 16 an electrically-conductive connection 18 leads to a baseband filter 20, which is typically a lowpass. From the output of the baseband filter 20 an electrically-conductive connection 22 leads to a signal processor unit 44 which contains a digital signal processor (DSP) for example. An electrically-conductive connection leads from an output of the signal processor unit 44 to an input E1 of a mixer unit 26. From the output of the mixer unit 26 an electrically-conductive connection 28 leads to an antenna 29.

From the branch 16 an electrically-conductive connection 30 also leads to a carrier frequency filter 32 which performs a narrowband filtering around a carrier frequency. From the output of the carrier frequency filter 32 an electrically-conductive connection leads to a PLL circuit 46, which for example contains a local oscillator which oscillates with the carrier frequency, with for example the accuracy not being as high as the accuracy of an oscillator which is used to create the carrier frequency which is used at the end of the polymer fiber line 12 not shown in the figure. From the output of the PLL circuit 46 an electrically-conductive connection leads to an input E2 of the mixer unit 26. An auxiliary carrier signal HT is transmitted on the electrical connection 36.

For example an amplitude modulated carrier signal is transmitted over the polymer fiber line 12, as explained below for example with reference to FIG. 3 or FIG. 4. After optical/electrical conversion a received data signal is created from the modulated carrier signal, which for example is already demodulated in the lowpass 20. However the demodulation can also be performed with the signal processor unit 44. Subsequently a modulation suitable for radio transmission is performed in the signal processor unit 44, especially a PSK (Phase Shift Keying) modulation or a QAM (Quadrature Amplitude Modulation). The filter 32 filters out the carrier frequency signal which however is very noisy as a result of its transmission on the polymer fiber 12. From the noisy carrier signal the PLL circuit 46 creates an auxiliary carrier signal HT which can be seen as a regenerated carrier signal and especially has the same phase relationship as the original carrier signal, in particular the auxiliary carrier signal HT is rigidly in phase with the original or undisturbed carrier signal. After the mixing of the auxiliary carrier signal HT with the modulated data signal created by the signal processor unit 44 a radio signal is produced which is emitted via the antenna 29, especially in the context of a MIMO application.

With other exemplary embodiments the antenna head is constructed as a passive antenna head, i.e. without the signal processor unit 44 and without the PLL circuit 46, see bracketed area 40 to 43. In a next exemplary embodiment there is only the signal processor unit 44, but not the PLL circuit 46. In this case the filtering by the carrier filter 32 is sufficient to regenerate the carrier signal. In an alternate development however the PLL circuit 46 is used but not the signal processor unit 44. In this case the mixer unit 26 operates as a modulator unit, which for example once again performs an amplitude modulation.

Figure 2:
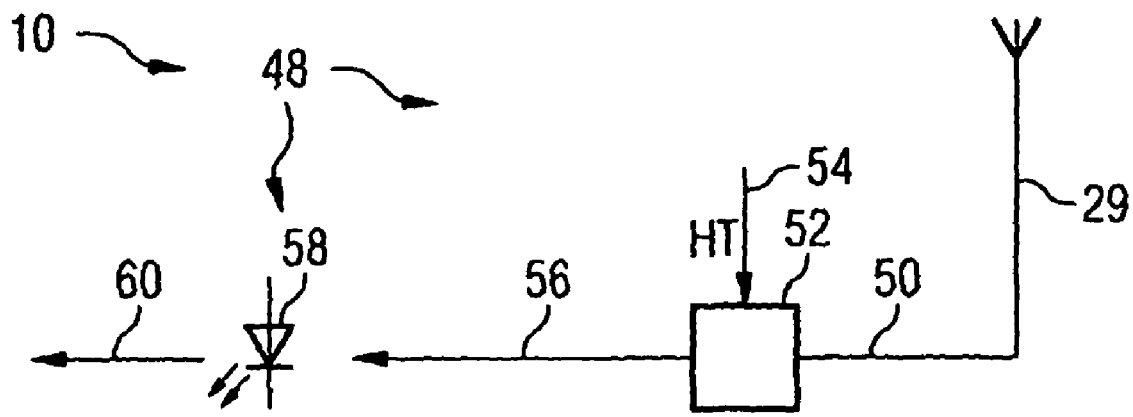
FIG. 2 a basic circuit diagram of a receive section of the antenna head.

FIG. 2 shows a basic circuit diagram of a receive section 48 of the antenna head 10. The antenna 29 or an additional receive antenna is connected via an electrically-conductive connection 50 to a demodulator or a signal mixer unit 52. The regenerated auxiliary carrier signal HT is also fed to the demodulator unit 52 via an electrical connection 54. From the output of the demodulator 52 an electrically-conductive connection leads to a terminal of an optical emitting diode, for example a laser diode or a light emitting diode. A polymer fiber 60 is connected to the diode 58. Alternatively a glass fiber is created. Thus the regenerated auxiliary carrier signal can also be used for the receipt of radio data which is then transmitted over a polymer fiber 60.

The demodulator 52 also contains a modulator for example which creates an amplitude-modulated carrier signal, as explained below with reference to FIG. 3 or 4. These amplitude modulated signals are especially suitable for transmission over polymer fibers or over very long glass fibers. The receive section 48 can also be constructed passively. Instead of the diode 58 a Mach-Zehender interferometer, a crystal can be used which changes its optical characteristics depending on a voltage, or a so-called Electro-Absorption Modulator (EAM) which is based on the Franz-Keldysh effect.

Figure 3:
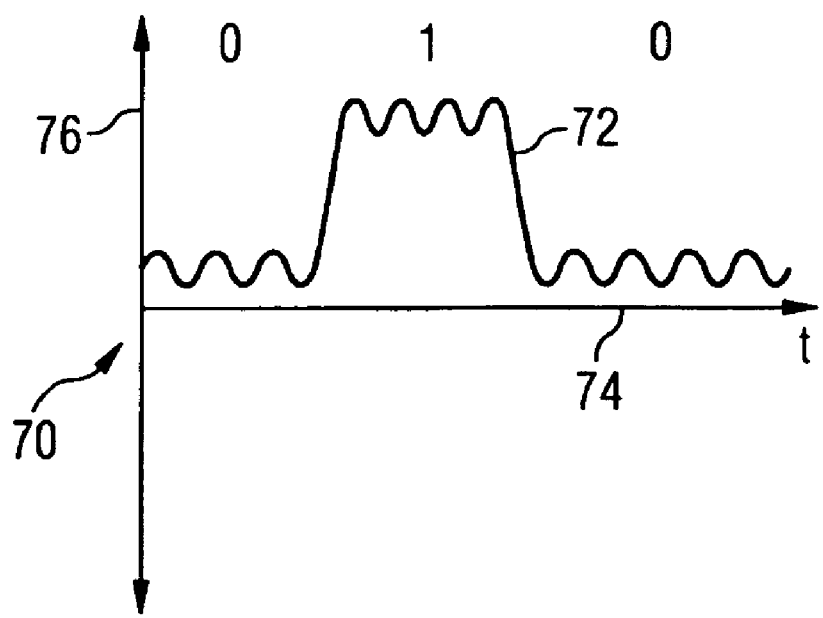
FIG. 3 a modulated carrier signal to be transmitted over a polymer fiber.

FIG. 3 shows in a coordinate system 70 a signal curve 72, which shows a modulated carrier signal to be transmitted over the polymer fiber 12. The coordinate system 70 has a horizontal x-axis, on which the time t is displayed. A vertical y-axis 76 is used to display the intensity or the power of the transmitted optical radiation. As shown in FIG. 3, for transmission of the data value zero the carrier signal is modulated so that it has a small peak value and a small minimum value. For transmission of the data value one on the other hand a larger peak value and a larger minimum value will be used. The difference between peak value and minimum value is greater than zero and for data value zero for example the same size as for data value one. Expressed in other words, the average value of the periodically changing carrier signal is changed with the amplitude remaining the same.

Figure 4:
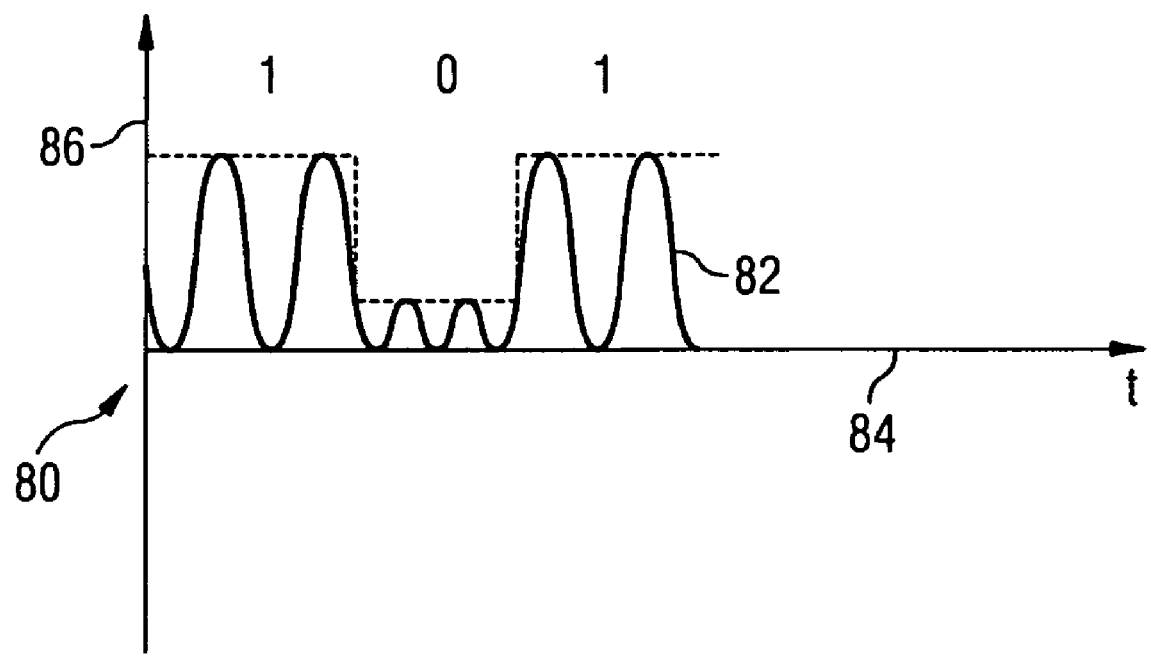
FIG. 4 a further modulated carrier signal to be transmitted over a polymer fiber.

FIG. 4 shows in a coordinate system 80 a signal curve 82 of a modulated carrier signal to be transmitted over the polymer fiber 12 in accordance with a second exemplary embodiment. The coordinate system 80 has a horizontal x-axis 84, on which the time t is plotted. The intensity or the power of the radiation, which is typically created by an optical transmitter, is plotted on a vertical y-axis 86.

As is evident from FIG. 4 for transmission of the data value one, the typically sine-wave or cosine-wave carrier signal is modulated so that it has a large peak value and a small minimum value, especially a minimum value zero. By contrast, for the transmission of the data value zero, the carrier signal is modulated so that it has a smaller peak value by comparison with the peak value for the data value zero, with the minimum value however continuing to have the value zero. The amplitude shift of the carrier signal thus changes depending on the data value to be transmitted.

Other types of amplitude modulation will be used with other exemplary embodiments. For example the signal forms for the data values zero and one can also be interchanged. Or a minimum value other than zero is used.

To summarize, the generic term "optical radio" is used to refer to technologies in which a part of the signals to be transmitted is transmitted either in the baseband or in the radio frequency band over an optical fiber, e.g. a glass fiber or polymer fiber. The exemplary embodiments described deal with the transmission of the radio frequency data over an optical link to the antenna via low-cost polymer fibers. Very high frequencies of up to 60 Gigahertz are typically required for future wireless data transmission technologies, for example for WLAN applications or in future mobile radio data transmission networks. Low-cost multimode polymer fibers however have a very high modal dispersion, so that at a frequency of typically 60 Gigahertz the maximum transmission surface for data amounts to only a few centimeters, e.g. less than 30 centimeters. This means that it is not possible to connect an antenna head via such a fiber, if the light is modulated with the RF (Radio Frequency) data signal. On the other hand a transmission of the typically 60 Gigahertz carrier frequency is desirable, since at such frequencies frequency generators are expensive and difficult to implement, especially without phase noise.

For MIMO applications or directed radio emissions in particular however a strict phase relationship between a number of antennas is necessary, which can only be implemented a great expense, if each antenna head is given its own oscillator. In the exemplary embodiments the data is transmitted on the baseband by the optical fiber and the carrier frequency is transmitted separately. This exploits the fact that as a result of the strong dispersion, although data can no longer be transmitted for example at 60 Gigahertz, however if for example a 60 Gigahertz carrier signal is transmitted, this is able to be reconstructed rigidly phased at the end of the fiber after narrowband filtering. The data to be transmitted for example has only a comparatively low data rate of a few orders of 10 Megabits per second, e.g. is less than 100 Megabits per second and is able to be transmitted over heavily dispersive media over a few 100 m (meters).

In an exemplary embodiment the antenna head has a structure such that a photo diode is located at its optical input, the electrical signal of which is divided up into two parts. The one part is filtered via a lowpass and delivers the baseband information to be sent. The second part is filtered via a narrowband filter at the carrier frequency and creates the carrier. A radio frequency mixer now creates from the baseband signal and the carrier signal the signal to be emitted.

If the radio frequency powers to be emitted are only very small, the entire antenna head can be designed as completely passive, i.e. without additional electrical power supply. The current coming from the photodiode supplies the required energy. The baseband lowpass filter, the carrier narrowband filter and the mixer are in this case passive components.

For the return channel especially the available carrier signal is used to transform the received RF signal into the baseband. The return channel is modulated with this baseband signal. This too is undertaken entirely passively in an exemplary embodiment.

The stated measures make the application of low-cost multimode polymer fibers possible for remote antenna units, especially for passively operating antenna units but also for actively operating antenna units.

With other exemplary embodiments however a high-level modulation method is not used for the transmission over the optical fiber line, such as QAM64 for example. High-level modulation methods cannot be transmitted without interference over highly-dispersive media. Therefore with these exemplary embodiments the data is transmitted in the baseband using simple modulation methods, e.g. on-off switching or on-off keying, and the radio signal to be sent out is created digitally in the antenna head, see signal processor unit 44.

The antenna head is in its turn constructed so that a photodiode is located at its optical input, the electrical signal of which is divided up into two parts. The one part is filtered via a lowpass and delivers the baseband information to be sent. The second part is filtered via a narrowband filter at the carrier frequency and creates the carrier.

In the antenna head itself is located a signal processor which converts the data to be sent into the desired modulation format. The modulated baseband data is now mixed with the reconstructed radio frequency carrier frequency and emitted via an antenna.

For the return channel the available carrier signal is again used in order to demodulate the received RF (radio frequency) signal again and transform it into the baseband. The return channel is modulated with this baseband signal, e.g. by on-off keying. This measure also makes possible the use of low-cost multimode polymer fibers for remote antennas.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for sending optically-transmitted data via a radio antenna, comprising:
    modulating a carrier signal depending on data to be transmitted or depending on a data signal to be transmitted while creating a modulated carrier signal, the modulated carrier signal being transmitted over an optical fiber line;
    receiving and demodulating the modulated carrier signal while creating received data or a received data signal;
    creating an auxiliary carrier signal from the modulated carrier signal;
    modulating the auxiliary carrier signal depending on the received data or the received data signal; and
    sending the modulated auxiliary carrier signal via the radio antenna.

2. The method as claimed in claim 1, wherein the carrier signal is modulated in accordance with an amplitude modulation depending on the data to be transmitted or depending on the data signal to be transmitted.

3. The method as claimed in claim 2, wherein when not transitioning between different data values, the modulated carrier signal has a substantially constant difference between a peak value and a following minimum value.

4. The method as claimed in claim 2, wherein the difference between a peak value and a following minimum value in the modulated carrier signal depends on which data value is to be transmitted.

5. The method as claimed in claim 1, wherein:
    the auxiliary carrier signal is created from the modulated carrier signal using a phased locked loop.

6. The method as claimed in claim 1, wherein:
    the auxiliary carrier signal is created using a filter unit.

7. The method as claimed in claim 1, wherein the modulated auxiliary carrier signal is sent using a plurality of antennas which simultaneously transmit data over a plurality of radio transmission links to a terminal.

8. The method as claimed in claim 1, wherein the optical fiber line is an organic polymer fiber line.

9. The method as claimed in claim 1, wherein the optical fiber line is a multimode fiber or a gradient index fiber.

10. The method as claimed in claim 1, wherein
    the optical fiber line is at least 50 meters long, and/or the carrier signal has a frequency greater than 20 Gigahertz.

11. The method as claimed in claim 1, further comprising:
    receiving the modulated auxiliary carrier signal via a received antenna, and demoldulating the modulated auxiliary carrier signal.

12. The method as claimed in claim 1, wherein
    the modulated carrier signal is transmitted from a source, the modulated auxiliary carrier signal is used for transmitting data back to the source, and
    the modulated auxiliary carrier signal is transmitted back to the source over the optical fiber line or over an auxiliary optical fiber line.

13. The method as claimed in claim 1, wherein
    the optical fiber line is at least 100 meters long, and/or
    the carrier signal has a frequency greater than 50 Gigahertz.

14. A device comprising:
    an optical/electrical converter unit;
    a first splitter unit connected downstream from the converter unit, which better transmits signals in a baseband frequency range than signals greater than the baseband frequency range;
    a second splitter unit connected downstream from the converter unit, which better transmits the signals in a main frequency range than the signals in the baseband frequency range, the main frequency range having a lower limit that is greater than an upper limit of the baseband frequency range; and
    a signal mixer unit or modulator unit connected downstream from the first splitter unit and the second splitter unit, which has a first input, to receive signals from the first splitter unit, and which has a second input to receive signals from the second splitter unit, the signal mixer unit or modulator unit creating a signal at an output, which is a mixture or modulation of the signals from the first and second splitter units.

15. The device as claimed in claim 14, wherein
the device contains both the signal mixer unit and the modulator unit,
the first and second inputs are part of the mixer unit, and
the modulator unit is connected downstream from the first splitter unit and connected upstream from the first input of the mixer unit.

16. The device as claimed in claim 14, wherein a phase locked loop unit is connected downstream from the second splitter unit and upstream from the second input of the mixer unit or modulator unit.

17. The device as claimed in claim 14, wherein
a radio antenna is connected downstream from the mixer unit or modulator unit.

18. The device as claimed in claim 17, wherein the radio antenna is sized for a transmit frequency greater than 20 Gigahertz.

19. The device as claimed in claim 14, wherein an optical fiber line leads to the optical/electrical converter unit.

20. The device as claimed in claim 14, wherein
a receive antenna receives the signal created by the signal mixer unit or modulator unit, and
the receive antenna is connected upstream from a demodulator unit.

21. The device as claimed in claim 17, wherein the radio antenna is sized for a transmit frequency greater than 50 Gigahertz.

* * * * *